United States Patent
Krips et al.

(10) Patent No.: US 11,824,603 B1
(45) Date of Patent: Nov. 21, 2023

(54) SUPERIMPOSED PILOTS SIGNALING FOR DENSE MU-MIMO

(71) Applicant: QUALCOMM Incorporated, San Diego, CA (US)

(72) Inventors: Ram Krips, Ramat Gan (IL); Gideon Shlomo Kutz, Ramat Hasharon (IL); Amit Bar-Or Tillinger, Tel-Aviv (IL); Elad Meir, Ramat Gan (IL); David Yunusov, Holon (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/935,545

(22) Filed: Sep. 26, 2022

(51) Int. Cl.
*H04B 7/0452* (2017.01)
*H04B 7/0456* (2017.01)

(52) U.S. Cl.
CPC ......... *H04B 7/0452* (2013.01); *H04B 7/0456* (2013.01)

(58) Field of Classification Search
CPC .............................. H04B 7/0452; H04B 7/0456
See application file for complete search history.

(56) References Cited

U.S. PATENT DOCUMENTS

| | | | |
|---|---|---|---|
| 7,436,757 B1 * | 10/2008 | Wilson | H04L 25/0232 455/562.1 |
| 2003/0043887 A1 * | 3/2003 | Hudson | H04L 25/03159 375/144 |
| 2021/0050974 A1 * | 2/2021 | Manolakos | H04W 72/0466 |

* cited by examiner

*Primary Examiner* — Vineeta S Panwalkar
(74) *Attorney, Agent, or Firm* — Procopio, Cory, Hargreaves & Savitch LLP

(57) ABSTRACT

An apparatus for wireless communication at a UE is provided. The apparatus is configured to receive one or more pilot signals superimposed on a data signal from a network entity. The apparatus is further configured to receive an indication of a first set of locations in at least one of time or frequency from the network entity. The data signal or the scrambled data signal is near orthogonal to a channel estimation filter of the transmission channel between the network entity and the UE at the first set of locations. The apparatus is further configured to transmit characteristics of the transmission channel to the network entity. The characteristics of the transmission channel is determined based at least in part on the first set of locations.

30 Claims, 12 Drawing Sheets

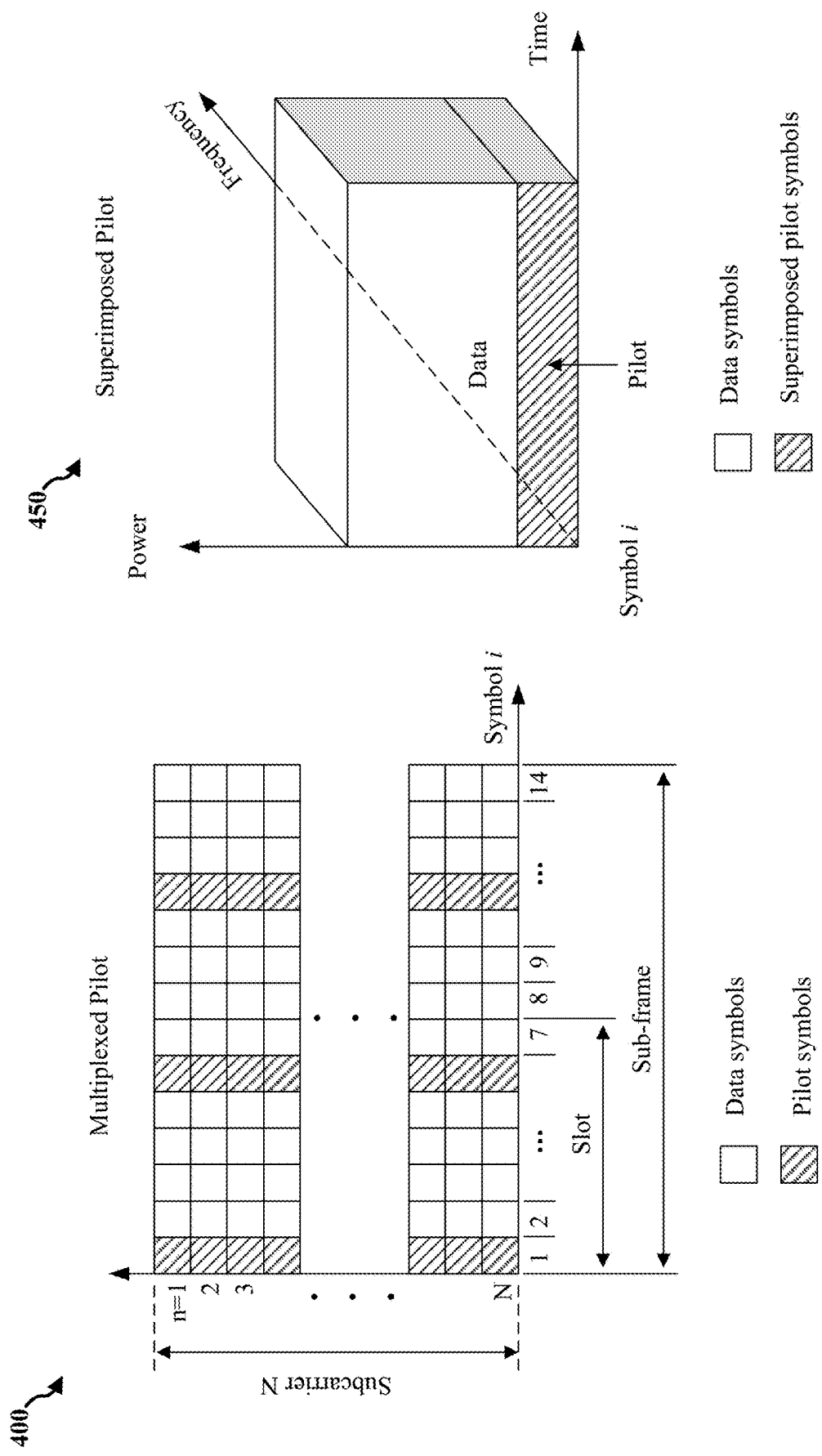

1. Using the signaled/tabulated scrambling sequence, for each Rx antenna and for each signaled group evaluate the estimated SIP input from antenna k:

$$\widetilde{y_k^{(i)}} = f_a^{(i)} * y_k$$

where, $y_k$ is the input signal at antenna k, $f_a^{(i)}$ is the modified LP filter of the $i^{th}$ group 2. Using the noise level at the port, define (for first iteration only):

$$Rnn = \frac{\sigma_n^2}{P(f_a^{(i)})} + T^2 |H_b^j|^2$$

where, P is the "power" of the LP filter.

3. For each SIP using MMSE estimation use $\widetilde{y_k^{(i)}}$ of its groups' regions to estimate the SIP'S channel (i.e., only little portion of the data is used which further reduces the complexity).
4. Removing estimated SIPs from Rx signal at each antenna $y_k^{cancel1} = y_k - \sum_i (B \otimes F) \overline{h_k}$
5. Simple Equalization and data estimation (e.g., using a slicer)
6. Estimated data is used for cancellation before next iteration: $y_{cancel2} = y - H_D \bar{x}$

FIG. 5

SUPERIMPOSED PILOTS SIGNALING FOR DENSE MU-MIMO

TECHNICAL FIELD

The present disclosure relates generally to communication systems, and more particularly, to wireless communication including superimposed pilots signaling.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus for wireless communication at a user equipment (UE) are provided. The apparatus may include a memory and at least one processor coupled to the memory. Based at least in part on information stored in the memory, the at least one processor is configured to receive, from a network entity, one or more pilot signals superimposed on a data signal and receive, from the network entity, an indication of a first set of locations in at least one of time or frequency, wherein the data signal is near orthogonal to a channel estimation filter of a transmission channel between the network entity and the UE at the first set of locations. The apparatus is configured to transmit, to the network entity, characteristics of the transmission channel, wherein the characteristics of the transmission channel is determined based at least in part on the first set of locations.

In an aspect of the disclosure, a method, a computer-readable medium, and an apparatus for wireless communication at a network entity are provided. The apparatus may include a memory and at least one processor coupled to the memory. Based at least in part on information stored in the memory, the at least one processor is configured to transmit one or more pilot signals superimposed on a data signal, from the network entity to a user equipment (UE) and indicate, to the UE, a first set of locations in at least one of time or frequency, wherein the data signal is near orthogonal to a channel estimation filter of a transmission channel between the network entity and the UE at the first set of locations. The apparatus is configured to receive, from the UE, characteristics of the transmission channel, wherein the characteristics of the transmission channel are determined based at least in part on the first set of locations.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 4A is a diagram illustrating multiplexed pilots in wireless communication.

FIG. 4B is a diagram illustrating superimposed pilots in wireless communication.

FIG. 5 is a diagram illustrating a receiver algorithm for superimposed pilots in wireless communication in accordance with various aspects of the present disclosure.

DETAILED DESCRIPTION

Figure 1:
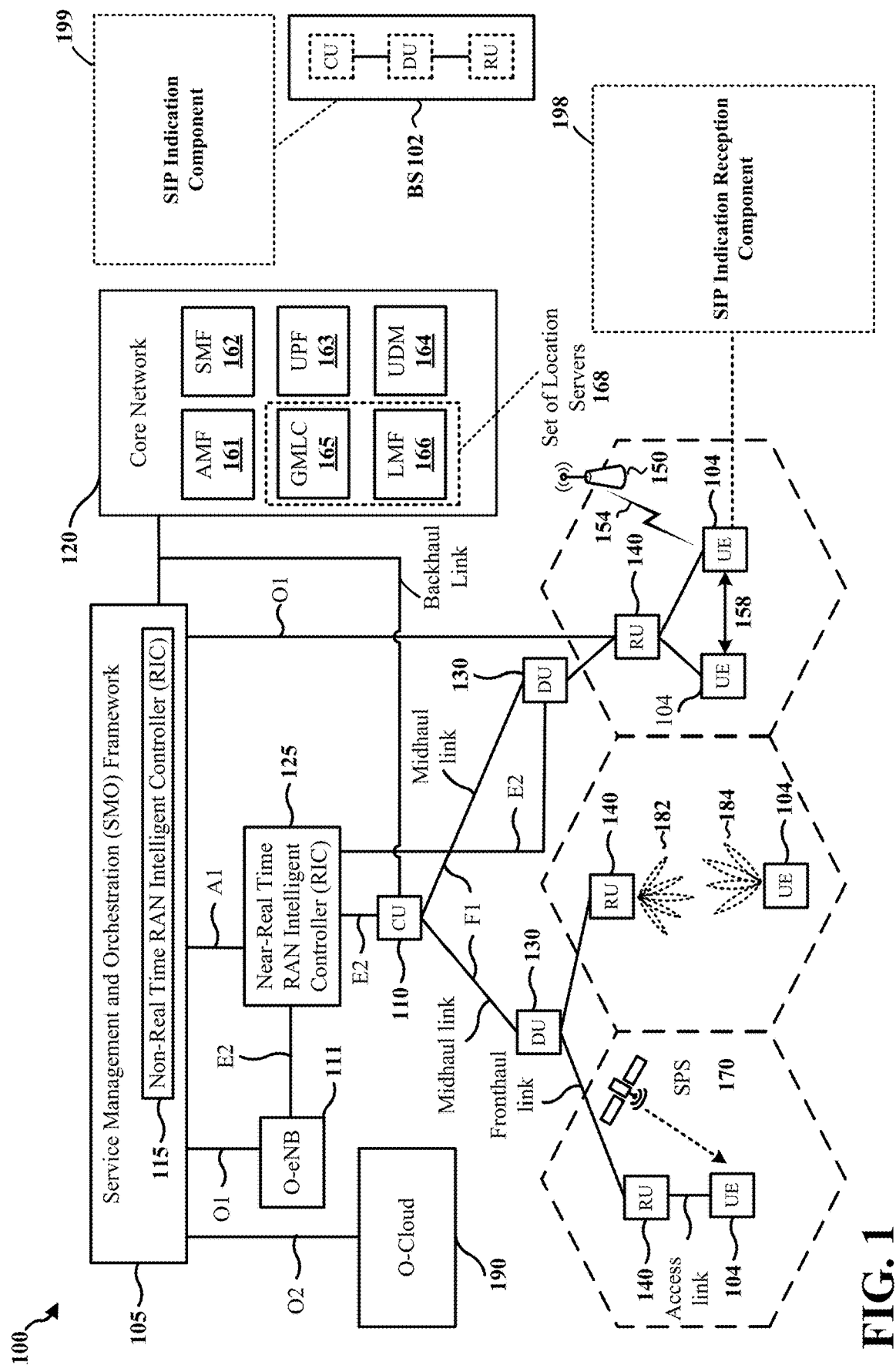
FIG. 1 is a diagram illustrating an example of a wireless communication system and an access network.

Dense multi-user multiple-input and multiple-output (MU-MIMO) uses a large number of transmission antennas to enable multiplexing of large numbers of users, which improves the spectrum utilization in a spatial domain. Precoding matrices are determined in order to improve overall throughput and minimize inter-user interference. Precoding adaptation involves channel estimation and reporting for a large number of transmission antennas. The use of superimposed pilots (SIP) allows a large number of reference signal (RS) ports to be used by superimposing the pilot signals for the different RS ports to be used for channel estimation to be superimposed on data. The estimation of the channel and data may increase complexity through an iterative receiver as the data is not orthogonal to the pilot. Aspects presented herein help to reduce the complexity of channel estimation and data reception through a network entity, such as a base station, indicating regions to the UE in which the data and the superimposed pilot are closer to orthogonal. The information enables the UE to perform a more efficient and accurate channel estimation of the transmission channel based on the indicated regions.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, is construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer-executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communication system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (S Cell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a SIP indication reception component 198. The SIP indication reception component 198 may be configured to receive, from a network entity, one or more pilot signals superimposed on a data signal and receive, from the network entity, an indication of a first set of locations in at least one of time or frequency, wherein the data signal is near orthogonal to a channel estimation filter of a transmission channel between the network entity and the UE at the first set of locations; and to transmit, to the network entity, characteristics of the transmission channel, wherein the characteristics of the transmission channel is determined based at least in part on the first set of locations.

In certain aspects, the base station 102 may include a SIP indication component 199. The SIP indication component 199 may be configured to transmit one or more pilot signals superimposed on a data signal, from the network entity to a UE and indicate, to the UE, a first set of locations in at least one of time or frequency, wherein the data signal is near orthogonal to a channel estimation filter of a transmission channel between the network entity and the UE at the first set of locations. The apparatus is configured to receive, from the UE, characteristics of the transmission channel, wherein the characteristics of the transmission channel are determined based at least in part on the first set of locations. Although the following description may be focused on 5G NR, the concepts described herein may be applicable to other similar areas, such as LTE, LTE-A, CDMA, GSM, and other wireless technologies.

Figure 2:
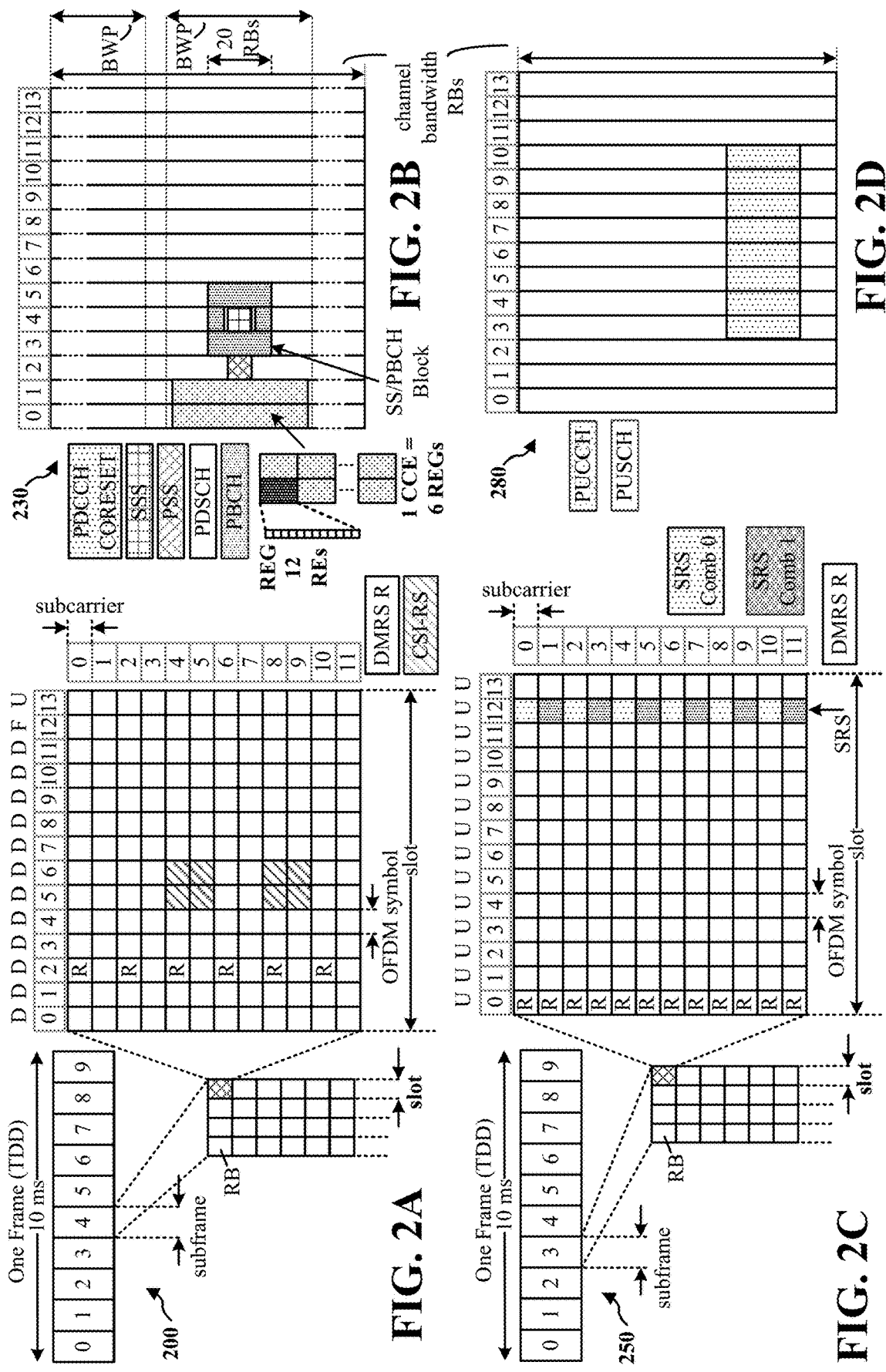
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through downlink control information (DCI), or semi-statically/statically through RRC signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| µ | SCS $\Delta f = 2^\mu \cdot 15[\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies µ 0 to 4 allow for 1, 2, 4, 8, and 16 slots, respectively, per subframe. For extended CP, the numerology 2 allows for 4 slots per subframe. Accordingly, for normal CP and numerology µ, there are 14 symbols/slot and $2^\mu$ slots/subframe.

The subcarrier spacing may be equal to $2^\mu*15$ kHz, where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of normal CP with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
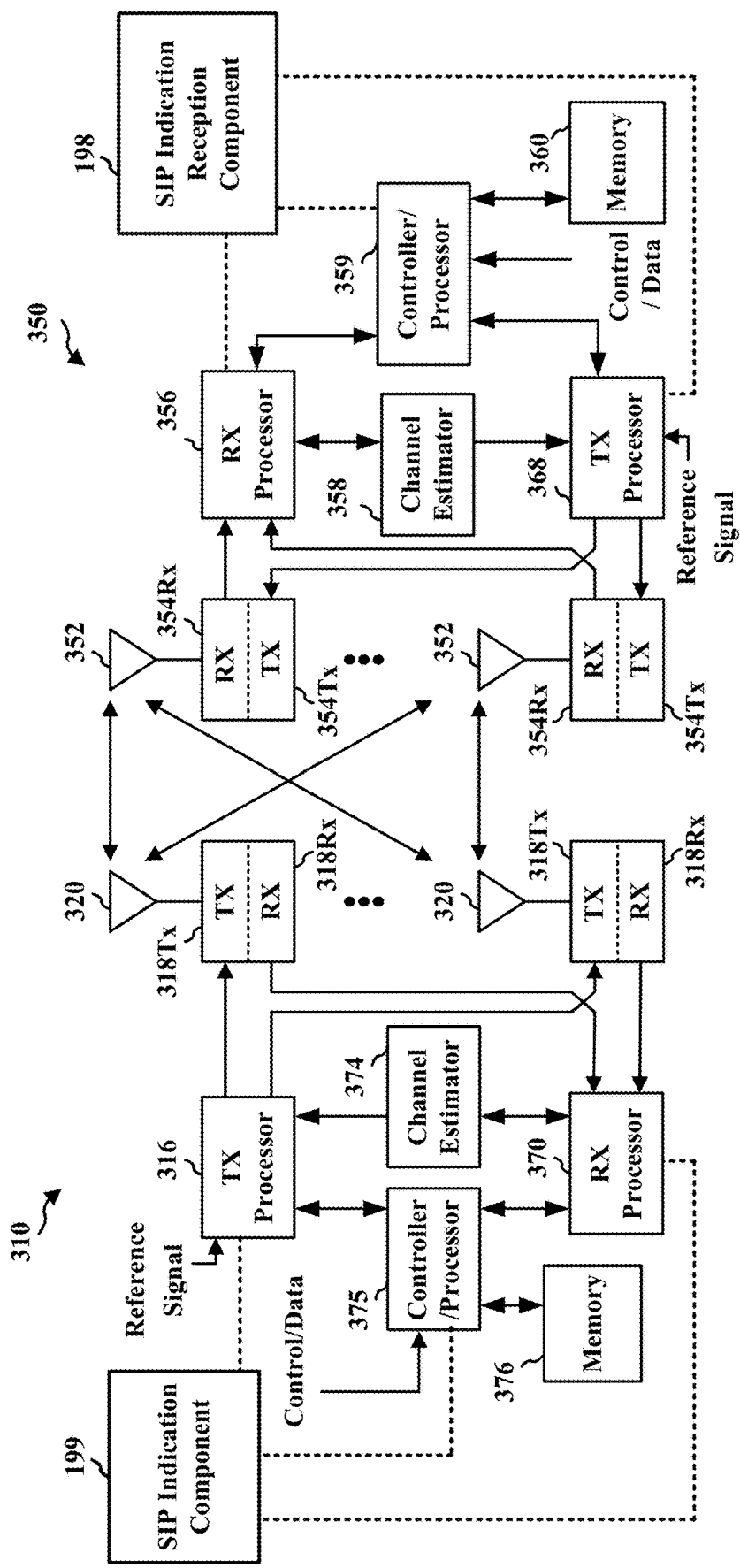
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes an RRC layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the SIP indication reception component 198 of FIG. 1.

At least one of the TX processor 316, the RX processor 370, and the controller/processor 375 may be configured to perform aspects in connection with the SIP indication component 199 of FIG. 1.

To increase spectral efficiency, large-scale multi-user multiple-input and multiple-output, called dense MU-MIMO may be employed. Dense MU-MIMO systems will use a large number of Tx antennas to enable multiplexing of a large number of users and improve spectrum utilization in the spatial domain. Communication based on MU-MIMO includes a determination of precoding matrices for a base station to optimize overall throughput and minimize inter-user interference. For precoding adaptation, the channel from a large number of transmission antennas to each of the users is estimated and reported. A large number of RS ports will be used for the channel estimation of the large number of transmission antennas for dense MU-MIMO.

The use of superimposed pilots (SIP) allows a large number of reference signal (RS) ports to be used by superimposing the pilot signals for the different RS ports to be used for channel estimation to be superimposed on data. The estimation of the channel and data may increase complexity through an iterative receiver as the data is not orthogonal to the pilot. Aspects presented herein help to reduce the complexity for channel estimation and data reception through a network entity, such as a base station, indicating regions to the UE in which the data and the superimposed pilot are closer to orthogonal. The information enables the UE to perform a more efficient and accurate channel estimation of the transmission channel based on the indicated regions.

A channel from a base station to the $i^{th}$ user may be represented as the matrix $H_i$ with $R_i$ receive antenna elements and T transmit antenna elements. The precoded channel to the user may be represented as $H_i P_i$, where $P_i$ is the precoding matrix. $P_i$ may be used to improve, e.g., optimize, the SNR for the $i^{th}$ user and minimize the interference for other users. A metric for the precoding matrix may be represented as:

$$P_i = \text{argmax} \frac{P_i^H H_i^H H_i P_i}{\sum_{j \neq i} P_i^H H_j^H H_j P_i} \quad (1)$$

which leads to $P_i$ being the dominant eigenvectors of $(\Sigma_{j \neq i}, H_j^H H_j)^{-1} H_i^H H_i$, and knowledge of $H_i^H H_i \forall i$ is obtained to calculate $P_i$.

In some aspects, a reference signal, such as DM-RS, may be one resource for estimating the matrix $H_i$. However, as DM-RS are precoded, the DM-RS provides partial information about the matrix $H_i$, which represents non-precoded channels. To obtain additional information, more Tx ports may be used to send additional reference signals. Various signals may be used as the additional reference signal. Examples of such additional reference signals may include CSI-RS, extended DM-RS, Cell-Specific Reference Signal (CRS), or SRS (e.g., if reciprocity is assumed between the uplink and downlink channel). However, a reference signal, such as these example reference signals, reduces the available bandwidth for data because such reference signals are multiplexed (e.g., in time/frequency) with the data.

In some aspects, superimposed pilot (SIP) signals may be superimposed on data without time and frequency resources being dedicated for the pilots. Instead, the pilots may be added on top of the data symbols. The SIPs may reduce the available power for the data, but do not reduce the time and frequency resources available for the data.

FIG. 4A is a diagram 400 illustrating multiplexed pilots in wireless communication that are multiplexed in time. FIG. 4B is a diagram 450 illustrating superimposed pilots in wireless communication. As shown in FIG. 4A, the pilots may be multiplexed with the data by sharing time/frequency/code (e.g., OCC code). Multiplexed pilots result in orthogonality of the data and the pilots but consume time and/or bandwidth resources. As shown in FIG. 4B, with superimposed pilots, pilots may be added to the data symbols, e.g., sharing time and frequency resources. The pilot and data may also share the Tx power resource. The SIP is not orthogonal to the data. Without orthogonality, reception may be more complex. However, superimposed pilots allow for higher available throughput for the data than multiplexed pilots.

In the present disclosure, a DM-RS used for data demodulation may still maintain orthogonality to the data. The superimposed pilot concept may apply to an additional reference signal, such as a superimposed CSI-RS, CRS, extended DM-RS, or other reference signal or pilot for estimation of the downlink precoder. In addition, the pilot ports may be orthogonal with each other by multiplexing either in frequency/time or code and not orthogonal to the data. This construction avoids pilot contamination and allows an efficient receiver to separate the data and pilots. Separation of the superimposed pilots from the data may be done by an iterative cancellation algorithm that jointly estimates the channel ports and the data. The iterative cancellation algorithm for the reception of superimposed pilots involves additional complexity at the receiver in comparison to the reception of multiplexed pilots.

The present disclosure presents methods and apparatus of wireless communication to allow for improved reception of superimposed pilots, e.g., and to reduce complexity at the receiver. In some aspects, the method of wireless communication may be performed at a UE. The UE may receive, from a network entity, one or more pilot signals superimposed on a data signal. The UE may receive, from the network entity, an indication of a first set of locations in at least one of time or frequency. The data signal may be near orthogonal to a channel estimation filter of the transmission channel between the network entity and the UE at the first set of locations. In some aspects, the locations, or regions, may be referred to as being close to orthogonal, near orthogonal, regions of increased orthogonality, etc. The locations inform a UE of resources in which the pilot signal is closer to orthogonal with the data. Based on the indicated locations, the UE may perform the channel estimation more efficiently and accurately. The UE may further transmit, to the network entity, characteristics of the transmission channel based on the first set of locations. The characteristics of the transmission channel may include the channel estimation or other requested characteristics of the channel, such as the channel quality/strength, the best channel among the available channels. By signaling the regions where the data and the pilots are substantially orthogonal (or near orthogonal), this method enables a more efficient and accurate channel estimation of the transmission channel based on these regions. Thus, it improves the efficiency of wireless communication.

When using the SIP, there the data and the SIP are not orthogonal. Nevertheless, statistically "almost" orthogonality or "near" orthogonality may be obtained in some of the channel coherence regions in time domain or frequency domain or a combination of time and frequency domain. A base station may send signaling that indicates the "close to orthogonality" regions (or "near orthogonal" regions) between the data and the pilots. The "close to orthogonality" indication may enable a more efficient and accurate channel estimation of the transmission channel based on the indication.

Using the minimum mean square error (MMSE) as an example, an MMSE channel estimation of the SIP channel in the receiver of a UE may be obtained by applying a channel estimation filter f on the received data. That is, the channel estimation may be generally described as:

$$\hat{h} = f^* y \approx f^*(h_D^* x + h_{SIP}^* p) = h_D^* f^* x + f^* p^* h_{SIP} \quad (2)$$

where h is the channel estimation, y is the input signal of the receiver, $h_D$ and $h_{SIP}$ are the channel estimation for the data and the SIP, respectively, x and p are the Tx data and the known SIP (e.g., SIP DM-RSs, assuming all "ones" for description simplicity), respectively, and "*" means convolution.

At locations k where the Tx data x is substantially orthogonal to p under a given estimation function (e.g., substantially orthogonal to f), the channel estimation may be:

$$\hat{h}[k] = f^* y[k] \approx f^* p^* h_{SIP}[k] = \widehat{h_{SIP}}[k] \quad (3)$$

where $\widehat{h_{SIP}}[k]$ is the SIP's channel estimation based on its DM-RS (e.g., which may be referred to as a desired estimation), and the location k of substantially orthogonal is defined as:

$$f^* x[k] \cong 0 \text{ or } |f^* x[k]| < T \quad (4)$$

where T is a predetermined threshold. In one example, assuming no mobility, a 2-D MMSE filter would average all symbols in time. In that case, the location k that satisfies Equation (4) could be a subcarrier index such as the sum of all data symbols corresponding to that sub-carrier is close to zero. More generally, the location k may be a combination of time and frequency resources.

After determining the locations k where the Tx data x is substantially orthogonal to the channel estimation filter f, the base station may signal the UE the locations k. At the locations k, according to Equation (3), the channel estimation $\hat{h}[k]$ approximately equals the channel estimation of the SIP $\widehat{h_{SIP}}[k]$ at the UE. Given enough locations, the complete channel response can be estimated at the UE.

To complete the channel estimation process described above, the UE may signal the channel estimation filter f to the base station. Alternatively, if the channel estimation filter is determined by power delay profile (PDP) and signal noise ratio (SNR) associated with the transmission channel, the UE may signal PDP and SNR (in lieu of the channel estimation filter f) to the base station. In the case, the channel estimation filter may be determined by PDP and SNR. The 2-D span of the channel estimation filter f (i.e., the chunk of frequency/time over which orthogonality is achieved) is to be defined. In one configuration, the 2-D span may be defined by the coherence time $C_t$ (in symbols) and the coherence bandwidth $C_b$ (in sub-carriers), respectively.

After receiving the channel estimation filter f, the base station may signal back the information related to the group of locations where the channel estimation filter f and the Tx data x are "almost" orthogonal or closer to orthogonal, which allows a more efficient and accurate channel estimation of the transmission channel at the receiver based on these locations. In some aspects, the channel estimation filter f and the Tx data x may be considered "almost" orthogonal (or "near" orthogonal) if |f*x [k]|<T, where T is the threshold of orthogonality that may be signaled to the UE by the base station, and k is the location of "almost" orthogonality (or "near" orthogonal).

In some aspects, to avoid signaling associated with the channel estimation filter f (e.g., a 2-D MMSE filter), the channel estimation filter f may be approximated as a convolution of two filters as: $f = g^* f_a$, where $f_a$ is a predetermined fixed filter that covers smaller regions in time and frequency (compared to the coherence time $C_t$ and coherence bandwidth $C_b$), and g is a filter defined by the UE. In one example, $f_a$ may be a fixed low pass filter, such as an averaging filter. In one example, $f_a$ may be predetermined and tabulated (e.g., stored in a table in a standard), and the UE may transmit a few bits of information indicating a specific $f_a$ used by the UE. In that case, the base station may signal to the UE the data regions k where the data x and $f_a$ is near orthogonal or meets a threshold relating to orthogonality (i.e., $|f_a^* x[k]| < T$).

The information for determining "almost" orthogonality (such as the threshold of orthogonality T, the coherence time $C_t$, the coherence bandwidth $C_b$, the predetermined fixed filter $f_a$) may be signaled in an RRC or medium access control (MAC) control element (MAC-CE) message. The list of locations may be signaled by the base station to the UE periodically at preset intervals (e.g., every slot or other period) as a part of the DCI message.

In some aspects, one or more scrambling sequences may be used to achieve orthogonality (or near orthogonality) between the data x and the channel estimation filter f. For some data sequences, the exact orthogonality condition between the data x and the channel estimation filter f may not be met (i.e., $f^* x[k] \neq 0$). However, orthogonality, or improved orthogonality, may be achieved after applying some de-scrambling sequences to the data. In this case, the base station may apply a scrambling sequence to the SIP and signal to the UE about the locations k where the data x and the channel estimation filter f are almost orthogonal under the scrambling sequence and the used scrambling sequence. The UE will apply de-scrambling, which will simultaneously descramble the DM-RS and make the data orthogonal to it. The scrambling sequences may be chosen from a scrambling sequence pool, which may be, for example, columns of the fast Hartley transform (FHT) matrix. Using scrambling sequences, several orthogonality sets may be defined to either allow for better channel estimation for one port or allow for channel estimation for several ports (using at least one orthogonality set for each port).

FIG. 5 is a diagram 500 illustrating a receiver algorithm and design for the reception of superimposed pilots in wireless communication in accordance with various aspects of the present disclosure. Receiver complexity may be increased based on data estimation in the presence of SIPs (taking into consideration the resulting correlation) and based on numerous iterations for the removal of SIP. The data channel estimation may be performed before the iterations based on orthogonal pilots. The multiple iterations may be performed for SIP channel estimation. Signaling the location information for each SIP channel may help to reduce the added complexity. Signaling may enable improved SIP channel estimation, especially on a first iteration. Thus, by informing the UE of the locations at which the SIP is closer to orthogonal with the data may reduce the number of iterations for the UE to estimate the channel and enable a simple data estimation (e.g., slicer) to be applied.

In one example, for each of the receiving antennas (i.e., for a single layer) the received data may be described by:

$$y = H_D^j x + \Sigma_i (B \otimes F) h_i + n \quad (5)$$

where x is the Tx data, $H_D^j$ is the $j^{th}$ data channel for the $j^{th}$ Rx antenna. B and F are the basis functions that describe the channel variation in time and frequency, respectively. $h_i$ is the (unknown) $i^{th}$ channel basis function for the $i^{th}$ SIP port $E[h_i h_i^H] = I\sigma_p^2$ and $E[h_i h_j^H] = 0 \forall j \neq i$. $\otimes$ represents the Kronecker product.

As shown in FIG. 5, the SIP channel estimation process may include the following four steps. At step 1, using the signaled/tabulated scrambling sequence, the estimated SIP input for each Rx antenna and for each signaled group may be evaluated by the receiver as:

$$\widetilde{y}_k^{(i)} = f_a^{(i)} * y_k \quad (6)$$

where $y_k$ is the input signal at antenna k, and $f_a^{(i)}$ is the modified lowpass (LP) filter of the $i^{th}$ group. At step 2, using the noise level at the port, (for first iteration) may be represented as:

$$Rnn = \frac{\sigma_n^2}{P(f_a^{(i)})} + T^2 |H_D^j|^2 \quad (7)$$

where P is the power of the LP filter.

$\widetilde{y}_k^{(i)}$ At step 3, for each SIP using MMSE estimation, the receiver may use of its groups' regions to estimate the SIP's channel (e.g., a small or reduced portion of the data may be used, which further reduces the complexity at the receiver). At step 4, the receiver may remove the estimated SIPs from the Rx signal at each antenna, i.e., $$\widetilde{y}_k^{(i)}$$

$$y_k^{cancel1} = y_k - \Sigma_i (B \otimes F) \overline{h}_k \quad (8)$$

After estimating the SIP, the receiver may estimate the data. As shown in FIG. 5, at step 5, the receiver may perform a simpler equalization and data estimation (e.g., using a slicer). At step 6, the receiver may use the estimated data for cancellation before the next iteration, i.e., $y_{cancel2} = y - H_D \overline{x}$.

Figure 6:
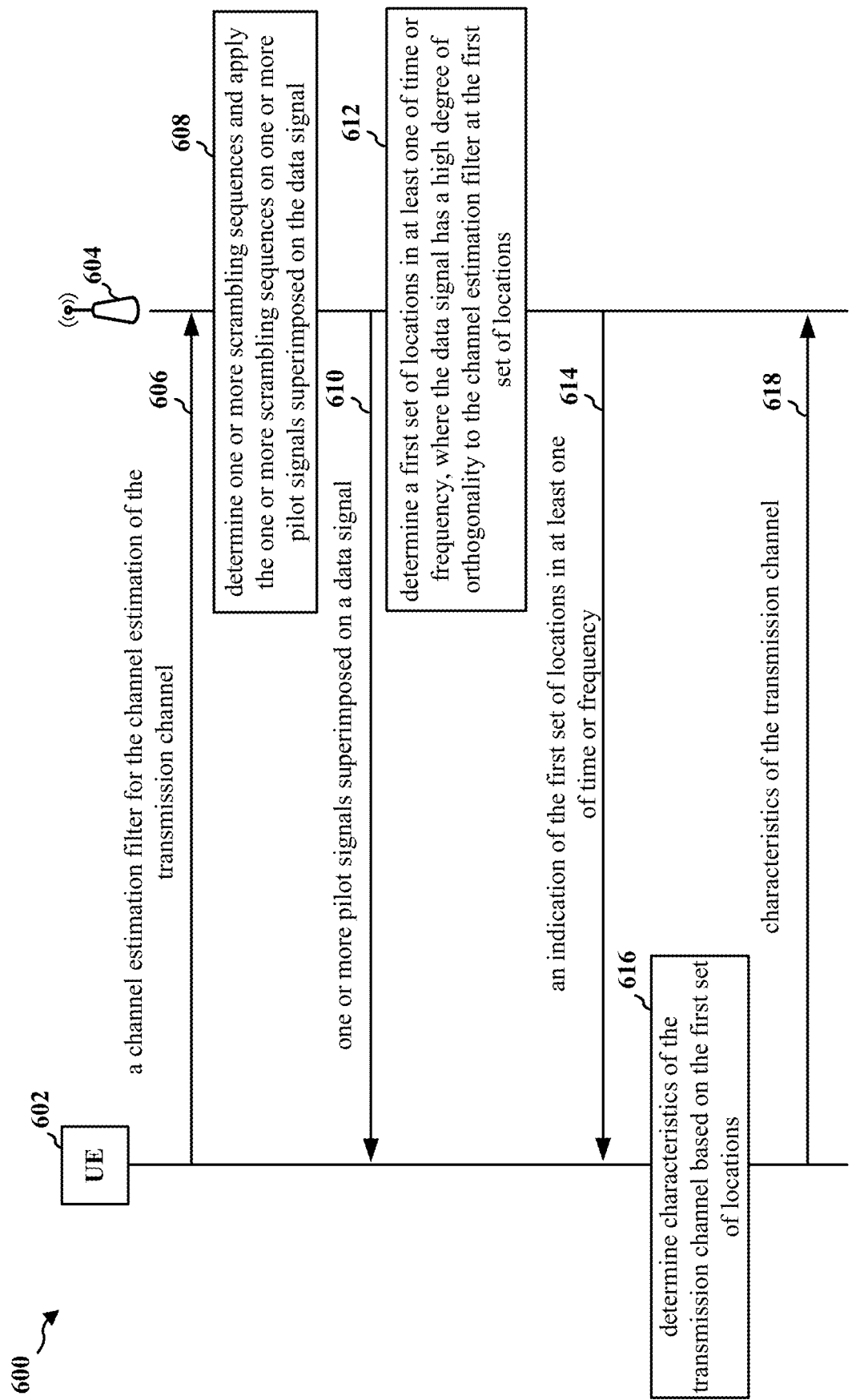
FIG. 6 is a call flow diagram illustrating methods of wireless communication in accordance with various aspects of the present disclosure.

FIG. 6 is a call flow diagram 600 illustrating methods of wireless communication in accordance with various aspects of the present disclosure. As shown in FIG. 6, a UE 602 may, at 606, transmit to a base station 604 a channel estimation filter for the channel estimation of the transmission channel between the UE 602 and the base station 604. In some aspects, the base station 604 may use one or more scrambling sequences to obtain near orthogonal between the data signal and the channel estimation filter. In that case, the base station 604 may, at 608, determine one or more scrambling sequences based on the received channel estimation filter. The base station 604 may, at 610, transmit one or more pilot signals superimposed on the data signal to the UE 602. If one or more scrambling sequences are used, the one or more pilot signals superimposed on the data signal may have been scrambled by the one or more scrambling sequences before they are transmitted to the UE 602. At 612, the base station 604 may determine a first set of locations in at least one of time or frequency. As an example, the locations may include one in 12 frequency locations or 1 in 24 frequency locations. The data signal may be near orthogonal to the channel estimation filter of the transmission channel at the first set of locations. In one example, at the first set of locations k, the data signal and the channel estimation filter may satisfy the condition of: $|f*x[k]|<T$, where f is the channel estimation filter, x is the data signal, and T is a threshold of orthogonality.

At 614, the base station 604 may transmit an indication of the first set of locations in at least one of time and frequency to the UE 602. At 616, the UE 602 may determine the characteristics of the transmission channel based on the first set of locations. At 618, the UE 602 may transmit to the base station 604 the characteristics of the transmission channel. The characteristics of the transmission channel may include one or more of: the channel estimation of the transmission channel, a measurement of the channel estimation, or other requested characteristics of the transmission channel, such as the channel quality/strength, the best channel among the available channels.

Figure 7:
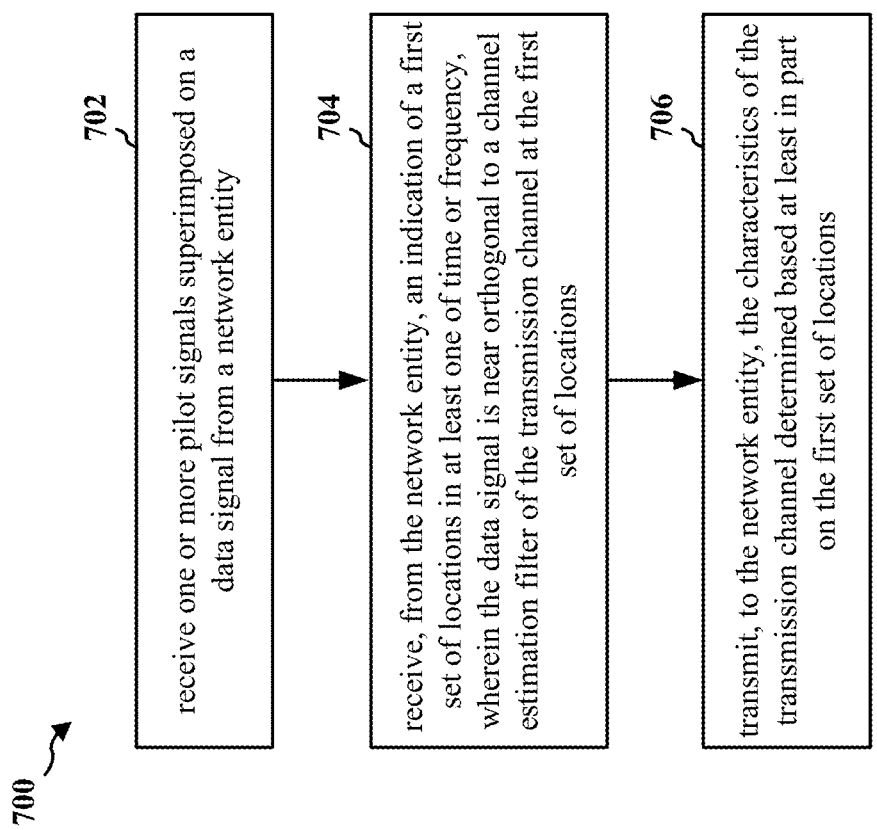
FIG. 7 is a first flowchart of a method of wireless communication at a user equipment (UE) in accordance with various aspects of the present disclosure.

FIG. 7 is a flowchart 700 of a method of wireless communication at a UE in accordance with various aspects of the present disclosure. The method may be performed by a UE. The UE may be the UE 104, 350, 602, or the apparatus 1104 in the hardware implementation of FIG. 11. The method provides configuration and signaling for superimposed pilots to enable a more efficient and accurate channel estimation of the transmission channel.

As shown in FIG. 7, at 702, the UE may receive one or more pilot signals superimposed on a data signal from a network entity. Each of the one or more pilot signals, e.g., SIPs, may be associated with different times, frequencies, or codes. In one configuration, the one or more pilot signals, e.g., SIPs, may be received via a different channel than the channel of receiving the data signal. In another configuration, the one or more pilot signals, e.g., SIPs, may be received via the same channel of receiving the data signal. The network entity may be a base station, or a component of a base station, in the access network of FIG. 1 or a core network component (e.g., base station 102, 310; base station 604; or the network entity 1102 in the hardware implementation of FIG. 11). FIGS. 5 and 6 illustrate various aspects of the steps in connection with flowchart 700. For example, referring to FIG. 6, the UE 602 may, at 610, receive one or more pilot signals superimposed on a data signal from a network entity (base station 604).

At 704, the UE may receive an indication of a first set of locations in at least one of time or frequency from the network entity. The data signal may be near orthogonal to a channel estimation filter of the transmission channel at the first set of locations. For example, referring to FIG. 6, the UE 602 may receive, at 614, an indication of the first set of locations in at least one of time or frequency from the network entity (base station 604). Referring to Equation (4), the data signal x and the channel estimation filter f of the transmission channel may be near orthogonal at the first set of locations (e.g., locations k) in that their convolution at the first set of locations (e.g., locations k) is less than a threshold T (i.e., |f*x[k]|<T).

At 706, the UE may transmit characteristics of the transmission channel between the network entity and the UE to the network entity. For example, referring to FIG. 6, the UE 602 may, at 618, transmit characteristics of the transmission channel between the network entity (base station 604) and the UE 602 to the network entity (base station 604). The characteristics of the transmission channel may be determined based at least in part on the first set of locations. In some configurations, other resources, such as other groups in a slot, may be used to transmit the pilot signal, and the characteristics of the transmission channel may be determined based on those resources too. The characteristics of the transmission channel may include one or more of: the channel estimation, a measurement of the channel estimation, or other request characteristics of the channel, such as the channel quality/strength, the best channel among the available channels. As an example, the channel estimation may be based on additional resources if the network entity transmits the additional resources on top of additional data locations (e.g., either without or with the same scrambling sequence as for the first set or with a different scrambling sequence).

Figure 8:
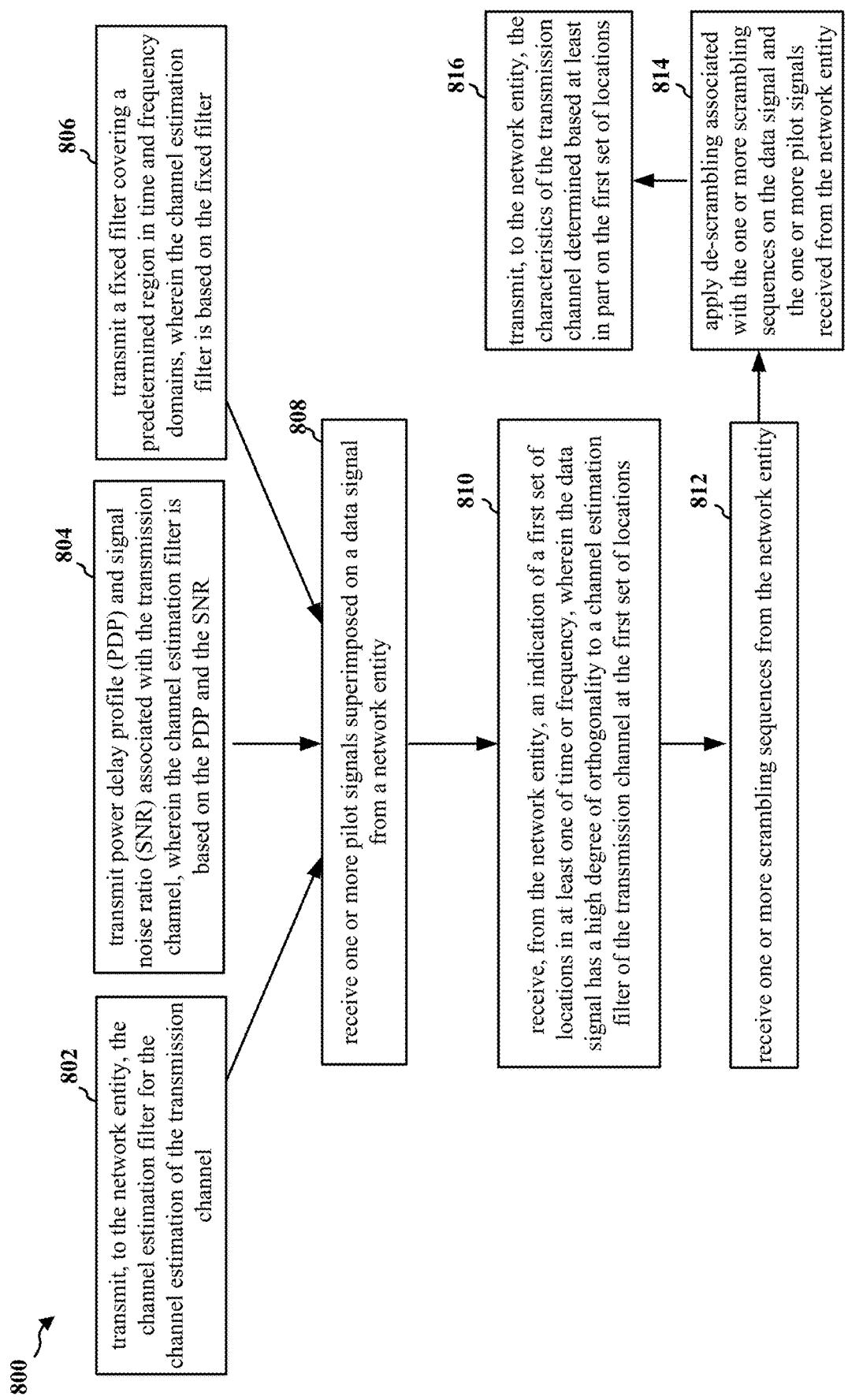
FIG. 8 is a second flowchart of a method of wireless communication at a UE in accordance with various aspects of the present disclosure.

FIG. 8 is a flowchart 800 of a method of wireless communication at a UE in accordance with various aspects of the present disclosure. The method may be performed by a UE. The UE may be the UE 104, 350, 602, or the apparatus 1104 in the hardware implementation of FIG. 11. The method provides configuration and signaling for superimposed pilots to enable a more efficient and accurate channel estimation of the transmission channel.

As shown in FIG. 8, at 808, the UE may receive one or more pilot signals superimposed on a data signal from a network entity. Each of the one or more pilot signals may be associated with different times, frequencies, or codes. In one configuration, the one or more pilot signals, e.g., SIPs, may be received via a different channel than the channel of receiving the data signal. In another configuration, the one or more pilot signals, e.g., SIPs, may be received via the same channel of receiving the data signal. The network entity may be a base station, or a component of a base station, in the access network of FIG. 1 or a core network component (e.g., base station 102, 310; base station 604; or the network entity 1102 in the hardware implementation of FIG. 11). FIGS. 5 and 6 illustrate various aspects of the steps in connection with flowchart 800. For example, referring to FIG. 6, the UE 602 may, at 610, receive one or more pilot signals superimposed on a data signal from a network entity (base station 604).

At 810, the UE may receive an indication of a first set of locations in at least one of time or frequency from the network entity. The data signal may be near orthogonal to a channel estimation filter of the transmission channel between the network entity and the UE at the first set of locations. For example, referring to FIG. 6, the UE 602 may receive, at 614, an indication of the first set of locations in at least one of time or frequency from the network entity (base station 604). Referring to Equation (4), the data signal x and the channel estimation filter f of the transmission channel may be near orthogonal at the first set of locations (e.g., locations k) in that their convolution at the first set of locations (e.g., locations k) is less than a threshold T (i.e., |f*x[k]|<T).

At 816, the UE may transmit characteristics of the transmission channel between the network entity and the UE to the network entity. For example, referring to FIG. 6, the UE 602 may, at 618, transmit characteristics of the transmission channel between the network entity and the UE to the network entity (base station 604). The characteristics of the transmission channel may be determined based at least in part on the first set of locations. In some configurations, other resources, such as other groups in a slot, may be used to transmit the pilot signal, and the characteristics of the transmission channel may be determined based on those resources too. The characteristics of the transmission channel may include one or more of: the channel estimation, a measurement of the channel estimation, or other requested characteristics of the channel, such as the channel quality/strength, the best channel among the available channels. As an example, the SIP may be transmitted over a group of resources, or portion of data transmission, with a first scrambling sequence and the same port on a second group of resources, or second portion of the data transmission, with a different scrambling sequence. The SIP may be transmitted on a single group of resources or portion of the data transmission. The SIP may be transmitted on the entire data transmission with the same scrambling sequence, obtaining near orthogonality at a particular group of resources. As an example, the channel estimation may be based on additional resources if the network entity transmits the additional resources on top of additional data locations (e.g., either without or with the same scrambling sequence as for the first set or with a different scrambling sequence).

In some aspects, at the first set of locations, the convolution of the data signal and the channel estimation filter may be less than a threshold. For example, the convolution of the data x and the channel estimation filter f may meet the condition of: f*x[k]≅0 or |f*x[k]|<T, as defined by Equation (4), where T is the threshold.

At 802, the UE may transmit the channel estimation filter for the channel estimation of the transmission channel to the network entity. For example, referring to FIG. 6, the UE 602 may, at 606, transmit the channel estimation filter for the channel estimation of the transmission channel to the network entity (base station 604).

In some aspects, the channel estimation filter may include a 2-dimensional (2D) MMSE filter. In some examples that do not involve mobility, the 2D MMSE filter may average all symbols in time. In this case, the first set of locations may be subcarrier indices of sub-carriers in which a sum of all data symbols on the sub-carriers is less than a threshold.

The UE may transmit the channel estimation filter in various ways. In one configuration, the UE may transmit the channel estimation filter by, at 804, transmitting the power delay profile (PDP) and the signal noise ratio (SNR) associated with the transmission channel to the network entity, and the channel estimation filter may be based on the PDP and the SNR. For example, referring to FIG. 6, when the UE 602 transmits, at 606, the channel estimation filter for the channel estimation of the transmission channel, the UE 602 may transmit the PDP and the SNR associated with the transmission channel to the network entity (base station 604), and the channel estimation filter may be based on the PDP and the SNR.

In some aspects, the filter span of the channel estimation filter may be based on the coherence time and the coherence bandwidth. In one example, the coherence time may be defined by the number of symbols, and the coherence bandwidth may be defined by the number of sub-carriers. In that case, the filter span of the channel estimation filter may be defined by the number of symbols and the number of sub-carriers.

In one configuration, the UE may transmit the channel estimation filter by, at 806, transmitting a fixed filter covering a predetermined region in time and frequency domains, and the channel estimation filter may be based on the fixed filter. For example, referring to FIG. 6, when the UE 602 transmits, at 606, the channel estimation filter for the channel estimation of the transmission channel to the network entity (base station 604), the UE 602 may transmit a fixed filter covering a predetermined region in time and frequency domains, and the channel estimation filter may be based on the fixed filter. In one example, the fixed filter may be an averaging filter. In some aspects, the fixed filter may be a filter selected from a set of filters stored in a filter table accessible by the network entity (base station 604). In that case, the UE 602 may transmit an index that identifies the fixed filter in the filter table to the network entity (base station 604), and the network entity (base station 604) may retrieve the fixed filter from the filter table based on the received index.

In some aspects, the threshold may be transmitted through an RRC message or a MAC-CE message, and the channel estimation filter may be transmitted through an RRC message or a MAC-CE message. For example, referring to FIG. 6, the network entity (base station 604) may determine the threshold T and transmit the threshold T to the UE 602 through an RRC message or a MAC-CE message. When the UE 602 transmits, at 606, the channel estimation filter to the network entity (base station 604), information related to the channel estimation filter, such as the coherence time $C_t$, the coherence bandwidth $C_b$, and the fixed filter $f_a$, may be transmitted through an RRC message or a MAC-CE message.

In some aspects, the UE may receive the indication of the first set of locations periodically at a preset interval. In some aspects, the preset interval may be one slot, and the indication of the first set of locations may be received by the UE as a part of DCI. For example, referring to FIG. 6, when the UE 602 receives, at 614, the indication of the first set of locations, the UE 602 may receive the indication periodically at a preset interval. In one example, the preset interval may be one slot, and the indication may be received by the UE 602 as a part of DCI.

At 812, the UE may receive one or more scrambling sequences from the network entity. At each slot, there may be multiple groups of resources with multiple scrambling sequences (a scrambling sequence for each group of resources) that convey the channels for multiple ports. Using the one or more scrambling sequences, multiple orthogonality sets may be defined to either allow for better channel estimation for one port or allow for channel estimation for several ports (using at least one orthogonality set for each port).

At 814, the UE may apply de-scrambling associated with the one or more scrambling sequences on the data signal and the one or more pilot signals received from the network entity. For example, referring to FIG. 6, when the UE 602 receives, at 614, the indication of the first set of locations from the network entity (base station 604), the UE 602 may also receive an indication of one or more scrambling sequences from the network entity (base station 604). The UE 602 may apply de-scrambling associated with the one or more scrambling sequences on the data signal received from the network entity (base station 604).

In some aspects, the one or more scrambling sequences may be selected from columns of the FHT matrix.

Figure 9:
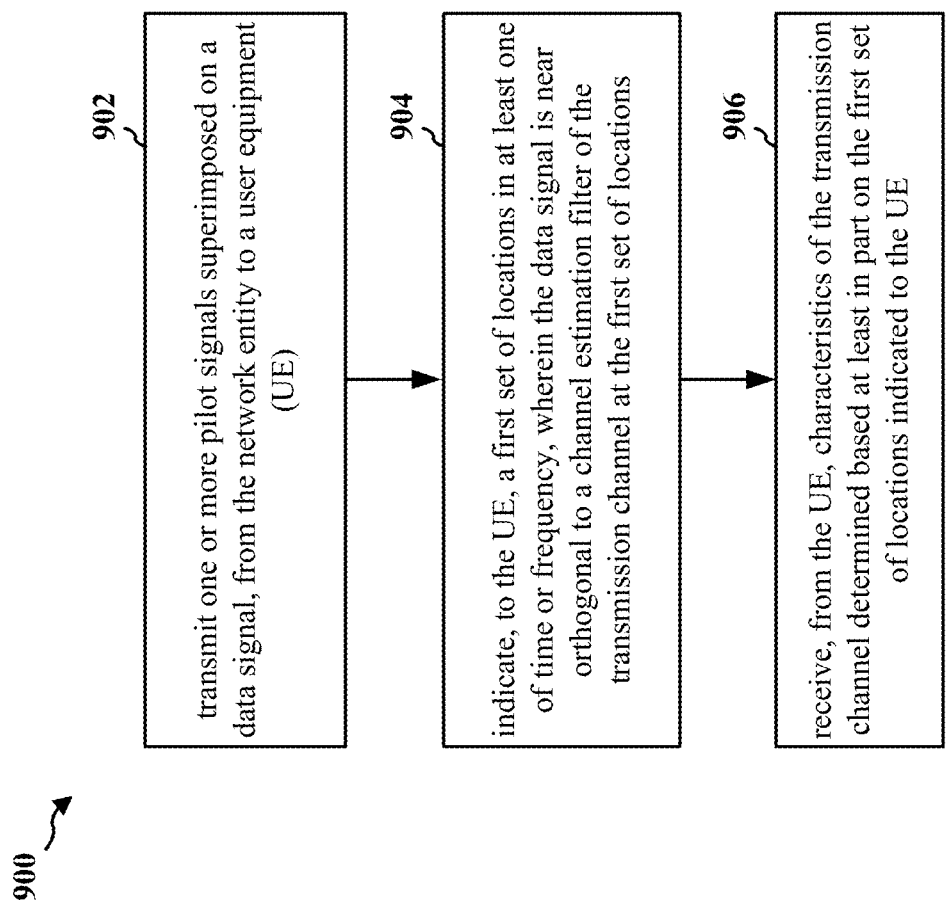
FIG. 9 is a first flowchart of a method of wireless communication at a network entity in accordance with various aspects of the present disclosure.

FIG. 9 is a flowchart 900 of a method of wireless communication at a network entity in accordance with various aspects of the present disclosure. The method may be performed by a network entity. The network entity may be a base station, or a component of a base station, in the access network of FIG. 1 or a core network component (e.g., base station 102, 310, 604; or the network entity 1102 in the hardware implementation of FIG. 11). The method provides configuration and signaling for superimposed pilots to enable a more efficient and accurate channel estimation of the transmission channel.

As shown in FIG. 9, at 902, the network entity may transmit one or more pilot signals superimposed on a data signal to a UE. Each of the one or more pilot signals may be associated with different times, frequencies, or codes. In one configuration, the one or more pilot signals may be transmitted via a different channel than the channel of transmitting the data signal. In another configuration, the one or more pilot signals may be transmitted via the same channel of transmitting the data signal. The UE may be the UE 104, 350, 602, or the apparatus 1104 in the hardware implementation of FIG. 11. FIGS. 5 and 6 illustrate various aspects of the steps in connection with flowchart 900. For example, referring to FIG. 6, the network entity (base station 604) may transmit, at 610, one or more pilot signals superimposed on a data signal to a UE 602.

At 904, the network entity may indicate a first set of locations in at least one of time or frequency to the UE. The data signal may be near orthogonal to a channel estimation filter of the transmission channel between the network entity and the UE at the first set of locations. For example, referring to FIG. 6, the network entity (base station 604) may, at 614, indicate the first set of locations in at least one of time or frequency to the UE 602. Referring to Equation (4), the data signal x and the channel estimation filter f of the transmission channel between the network entity and the UE may be near orthogonal at the first set of locations (e.g., locations k) in that their convolution at the first set of locations (e.g., locations k) is less than a threshold T (i.e., $|f*x[k]|<T$).

At 906, the network entity may receive from the UE characteristics of the transmission channel between the network entity and the UE. For example, referring to FIG. 6, the network entity (base station 604) may receive, at 618, from the UE 602, characteristics of the transmission channel between the network entity (base station 604) and the UE 602. The characteristics of the transmission channel may be determined based at least in part on the first set of locations. In some configurations, other resources, such as other groups in a slot, may be used to transmit the pilot signal, and the characteristics of the transmission channel may be determined based on those resources too. The characteristics of the transmission channel may include one or more of: the channel estimation of the transmission channel, a measurement of the channel estimation, or other requested characteristics of the transmission channel, such as the channel quality/strength, the best channel among the available channels.

Figure 10:
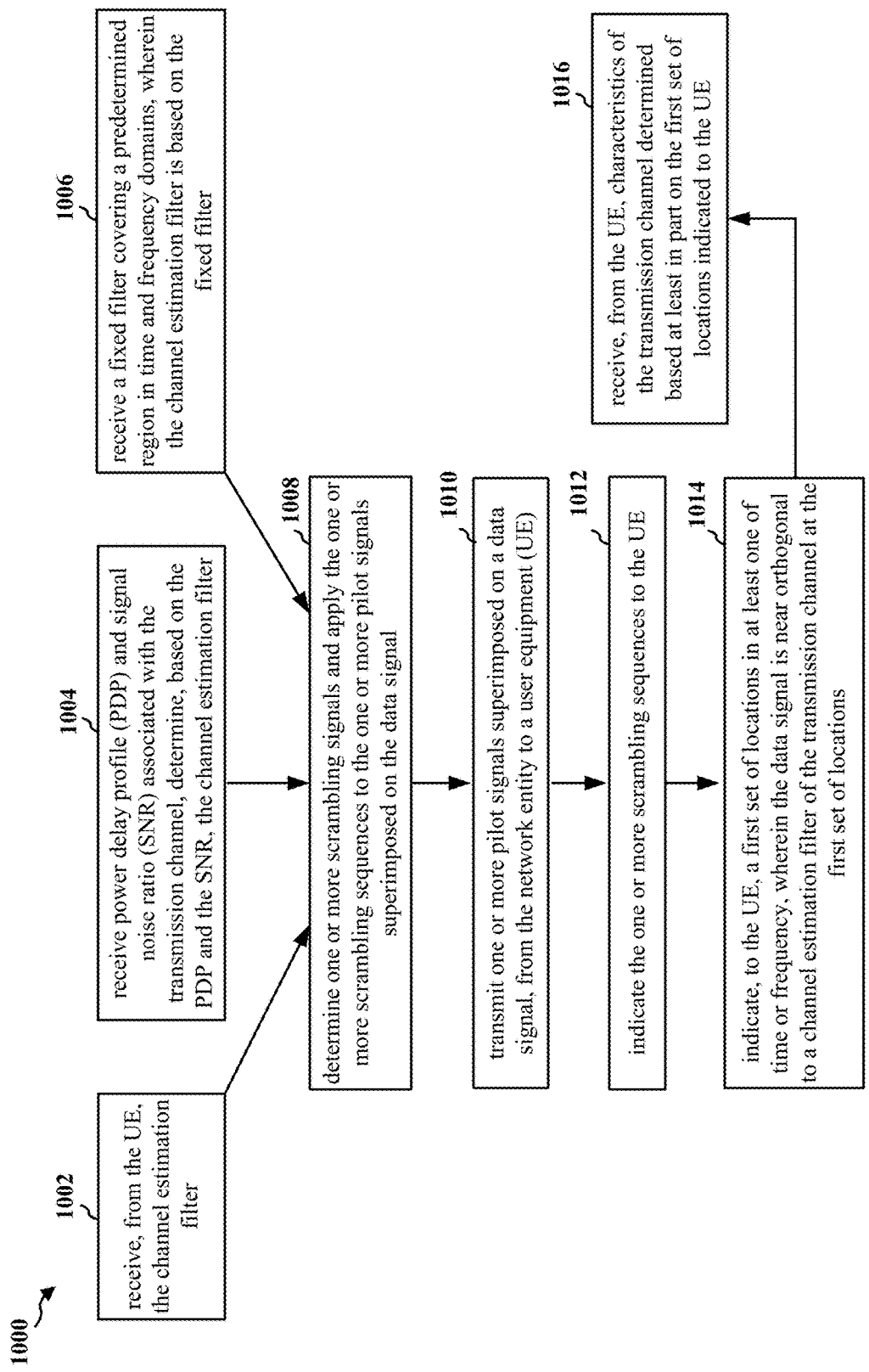
FIG. 10 is a second flowchart of a method of wireless communication at a network entity in accordance with various aspects of the present disclosure.

FIG. 10 is a flowchart 1000 of a method of wireless communication at a network entity in accordance with various aspects of the present disclosure. The method may be performed by a network entity. The network entity may be a base station, or a component of a base station, in the access network of FIG. 1 or a core network component (e.g., base station 102, 310, 604; or the network entity 1102 in the hardware implementation of FIG. 11). The method provides configuration and signaling for superimposed pilots to enable a more efficient and accurate channel estimation of the transmission channel.

As shown in FIG. 10, at 1010, the network entity may transmit one or more pilot signals superimposed on a data signal to a UE. Each of the one or more pilot signals may be associated with different times, frequencies, or codes. In one configuration, the one or more pilot signals may be transmitted via a different channel than the channel of transmitting the data signal. In another configuration, the one or more pilot signals may be transmitted via the same channel of transmitting the data signal. The UE may be the UE 104, 350, 602, or the apparatus 1104 in the hardware implementation of FIG. 11. FIGS. 5 and 6 illustrate various aspects of the steps in connection with flowchart 1000. For example, referring to FIG. 6, the network entity (base station 604) may transmit, at 610, one or more pilot signals superimposed on a data signal to a UE 602.

At 1014, the network entity may indicate a first set of locations in at least one of time or frequency to the UE. The data signal may be near orthogonal to a channel estimation filter of the transmission channel between the network entity and the UE at the first set of locations. For example, referring to FIG. 6, the network entity (base station 604) may, at 614, indicate the first set of locations in at least one of time or frequency to the UE 602. Referring to Equation (4), the data signal x and the channel estimation filter f of the transmission channel may be near orthogonal at the first set of locations (e.g., locations k) in that their convolution at the first set of locations (e.g., locations k) is less than a threshold T (i.e., $|f*x[k]|<T$).

At 1016, the network entity may receive from the UE characteristics of the transmission channel between the network entity and the UE. For example, referring to FIG. 6, the network entity (base station 604) may receive, at 618, from the UE 602 characteristics of the transmission channel between the network entity (base station 604) and the UE 602. The characteristics of the transmission channel may be determined based at least in part on the first set of locations. In some configurations, other resources, such as other groups in a slot, may be used to transmit the pilot signal, and the characteristics of the transmission channel may be determined based on those resources too. The characteristics of the transmission channel may include one or more of: the channel estimation of the transmission channel, a measurement of the channel estimation, or other requested characteristics of the transmission channel, such as the channel quality/strength, the best channel among the available channels.

In some aspects, at the first set of locations, the convolution of the data signal and the channel estimation filter may be less than a threshold. For example, the convolution of the data x and the channel estimation filter f may meet the condition of: $f*x[k]\approx 0$ or $|f*x[k]|<T$, as defined by Equation (4), where T is the threshold.

In some aspects, the network entity may obtain the channel estimation filter for the channel estimation of the transmission channel. For example, referring to FIG. 6, the network entity (base station 604) may, at 606, obtain the channel estimation filter for the channel estimation of the transmission channel from the UE 602.

In some aspects, the channel estimation filter may include a 2D MMSE filter. In some examples that do not involve mobility, the 2D MMSE filter may average all symbols in time. In this case, the first set of locations may be subcarrier indices of sub-carriers in which a sum of all data symbols on the sub-carriers is less than a threshold.

The network entity may obtain the channel estimation filter in various ways. In one configuration, to obtain the channel estimation filter, the network entity may, at 1002, receive the channel estimation filter from the UE. For example, referring to FIG. 6, the network entity (base station 604) may, at 606, receive the channel estimation filter from the UE 602.

In one configuration, to obtain the channel estimation filter, the network entity may, at 1004, receive the PDP and the SNR associated with the transmission channel, and determine the channel estimation filter based on the PDP and the SNR. For example, referring to FIG. 6, when the network entity (base station 604) receives, at 606, the channel estimation filter for the channel estimation of the transmission channel, the network entity (base station 604) may receive the PDP and the SNR associated with the transmission channel, and the channel estimation filter may be determined based on the PDP and the SNR.

In some aspects, the filter span of the channel estimation filter may be based on the coherence time and the coherence bandwidth. In one example, the coherence time may be defined by the number of symbols, and the coherence bandwidth may be defined by the number of sub-carriers. In that case, the filter span of the channel estimation filter may be defined by the number of symbols and the number of sub-carriers.

In one configuration, to obtain the channel estimation filter, the network entity may, at 1006, receive a fixed filter covering a predetermined region in time and frequency domains, and the channel estimation filter may be based on the fixed filter. For example, referring to FIG. 6, when the network entity (base station 604) receives, at 606, the channel estimation filter for the channel estimation of the transmission channel, the network entity (base station 604) may receive a fixed filter covering a predetermined region in time and frequency domains, and the channel estimation filter may be based on the fixed filter. In one example, the fixed filter may be an averaging filter. In some aspects, the fixed filter may be a filter selected from a set of filters stored in a filter table accessible by the network entity (base station 604). In that case, the network entity (base station 604) may receive an index that identifies the fixed filter in the filter table, and the network entity (base station 604) may retrieve the fixed filter from the filter table based on the received index.

In some aspects, the threshold may be transmitted through an RRC message or a MAC-CE message, and the channel estimation filter may be transmitted through an RRC message or a MAC-CE message. For example, referring to FIG. 6, the network entity (base station 604) may determine the threshold T and transmit the threshold T to the UE 602 through an RRC message or a MAC-CE message. When the network entity (base station 604) receives, at 606, the channel estimation filter, information related to the channel estimation filter, such as the coherence time $C_t$, the coherence bandwidth $C_b$, and the fixed filter $f_a$, may be received through an RRC message or a MAC-CE message.

In some aspects, the network entity may transmit the indication of the first set of locations periodically at a preset interval. In some aspects, the preset interval may be one slot, and the indication of the first set of locations may be transmitted by the network entity as a part of DCI. For example, referring to FIG. 6, when the network entity (base station 604) transmits, at 614, the indication of the first set of locations, the network entity (base station 604) may transmit the indication periodically at a preset interval. In one example, the preset interval may be one slot, and the indication may be transmitted by the network entity (base station 604) as a part of DCI.

At 1008, the network entity may determine one or more scrambling sequences and apply the one or more scrambling sequences to one or more pilot signals superimposed on the data signal. At each slot, there may be several groups with several scrambling sequences (one for each group) that convey the channels for several ports. Using the one or more scrambling sequences, several orthogonality sets may be defined to either allow for better channel estimation for one port or allow for channel estimation for several ports (using at least one orthogonality set for each port). At 1012, the network entity may indicate the one or more scrambling sequences to the UE. For example, referring to FIG. 6, the network entity (base station 604) may, at 608, apply one or more scrambling sequences to the one or more pilot signals superimposed on the data signal. The network entity (base station 604) may transmit an indication of the one or more scrambling sequences to the UE 602. In some aspects, the one or more scrambling sequences may be selected from a set of sequences stored in a sequence table accessible by the UE 602. In that case, the network entity (base station 604) may transmit one or more indices that identify the one or more scrambling sequences in the sequence table, and the UE 602 may retrieve the one or more scrambling sequences from the sequence table based on the received indices.

In some aspects, the one or more scrambling sequences may be selected from columns of the FHT matrix.

Figure 11:
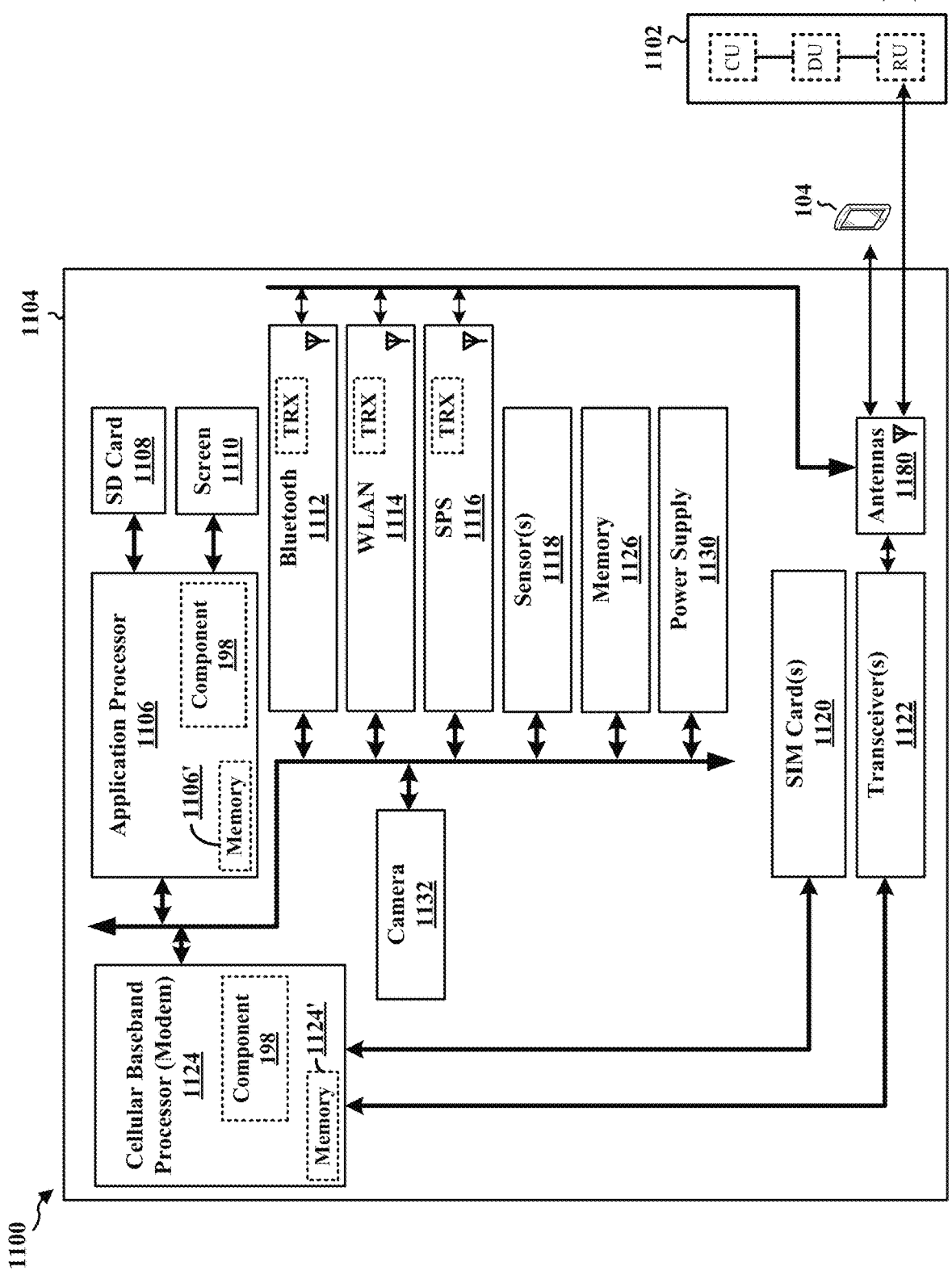
FIG. 11 is a diagram illustrating an example of a hardware implementation for an example apparatus and/or network entity.

FIG. 11 is a diagram 1100 illustrating an example of a hardware implementation for an apparatus 1104. The apparatus 1104 may be a UE, a component of a UE, or may implement UE functionality. In some aspects, the apparatus 1104 may include a cellular baseband processor 1124 (also referred to as a modem) coupled to one or more transceivers 1122 (e.g., cellular RF transceiver). The cellular baseband processor 1124 may include on-chip memory 1124'. In some aspects, the apparatus 1104 may further include one or more subscriber identity modules (SIM) cards 1120 and an application processor 1106 coupled to a secure digital (SD) card 1108 and a screen 1110. The application processor 1106 may include on-chip memory 1106'. In some aspects, the apparatus 1104 may further include a Bluetooth module 1112, a WLAN module 1114, an SPS module 1116 (e.g., GNSS module), one or more sensor modules 1118 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the SPS module 1116 may include an on-chip transceiver (TRX) (or in some cases, just a receiver (RX)). The Bluetooth module 1112, the WLAN module 1114, and the SPS module 1116 may include their own dedicated antennas and/or utilize the antennas 1180 for communication. The cellular baseband processor 1124 communicates through the transceiver(s) 1122 via one or more antennas 1180 with the UE 104 and/or with an RU associated with a network entity 1102. The cellular baseband processor 1124 and the application processor 1106 may each include a computer-readable medium/memory 1124', 1106', respectively. The additional memory modules 1126 may also be considered a computer-readable medium/memory. Each computer-readable medium/memory 1124', 1106', 1126 may be non-transitory. The cellular baseband processor 1124 and the application processor 1106 are each responsible for general processing, including the execution of software stored on the computer-readable medium/memory. The software, when executed by the cellular baseband processor 1124/application processor 1106, causes the cellular baseband processor 1124/application processor 1106 to perform the various functions described supra. The computer-readable medium/memory may also be used for storing data that is manipulated by the cellular baseband processor 1124/application processor 1106 when executing software. The cellular baseband processor 1124/application processor 1106 may be a component of the UE 350 and may include the memory 360 and/or at least one of the TX processor 368, the RX processor 356, and the controller/processor 359. In one configuration, the apparatus 1104 may be a processor chip (modem and/or application) and include just the cellular baseband processor 1124 and/or the application processor 1106, and in another configuration, the apparatus 1104 may be the entire UE (e.g., see 350 of FIG. 3) and include the additional modules of the apparatus 1104.

As discussed supra, the component 198 is configured to receive, from a network entity, one or more pilot signals superimposed on a data signal. The component 198 is further configured to receive, from the network entity, an indication of a first set of locations in at least one of time or frequency. The data signal may be near orthogonal to a channel estimation filter of the transmission channel between the network entity and the UE at the first set of locations. The component 198 may be further configured to transmit, to the network entity, characteristics of the transmission channel. The characteristics of the transmission channel may include one or more of: the channel estimation of the transmission channel, a measurement of the channel estimation, or other requested characteristics of the transmission channel, such as the channel quality/strength, the best channel among the available channels. The component 198 may be further configured to perform any of the aspects described in connection with the flowchart in FIG. 7, FIG. 8, and/or performed by the UE 602 in FIG. 6 or the receiver in FIG. 5. The component 198 may be within the cellular baseband processor 1124, the application processor 1106, or both the cellular baseband processor 1124 and the application processor 1106. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1104 may include a variety of components configured for various functions. In one configuration, the apparatus 1104, and in particular, the cellular baseband processor 1124 and/or the application processor 1106, includes means for receiving, from a network entity, one or more pilot signals superimposed on a data signal, and means for receiving, from the network entity, an indication of a first set of locations in at least one of time or frequency. The data signal may be near orthogonal to a channel estimation filter of the transmission channel between the network entity and the UE at the first set of locations. The apparatus 1104 may further include means for transmitting, to the network entity, characteristics of the transmission channel. The characteristics of the transmission channel may include one or more of: the channel estimation of the transmission channel, a measurement of the channel estimation, or other requested characteristics of the transmission channel, such as the channel quality/strength, the best channel among the available channels. The apparatus 1104 may further include means for performing any of the aspects described in connection with the flowcharts in FIGS. 7 and 8, and/or the aspects performed by the UE 602 in FIG. 6 or the receiver in FIG. 5. The means may be the component 198 of the apparatus 1104 configured to perform the functions recited by the means. As described supra, the apparatus 1104 may include the TX processor 368, the RX processor 356, and the controller/processor 359. As such, in one configuration, the means may be the TX processor 368, the RX processor 356, and/or the controller/processor 359 configured to perform the functions recited by the means.

Figure 12:
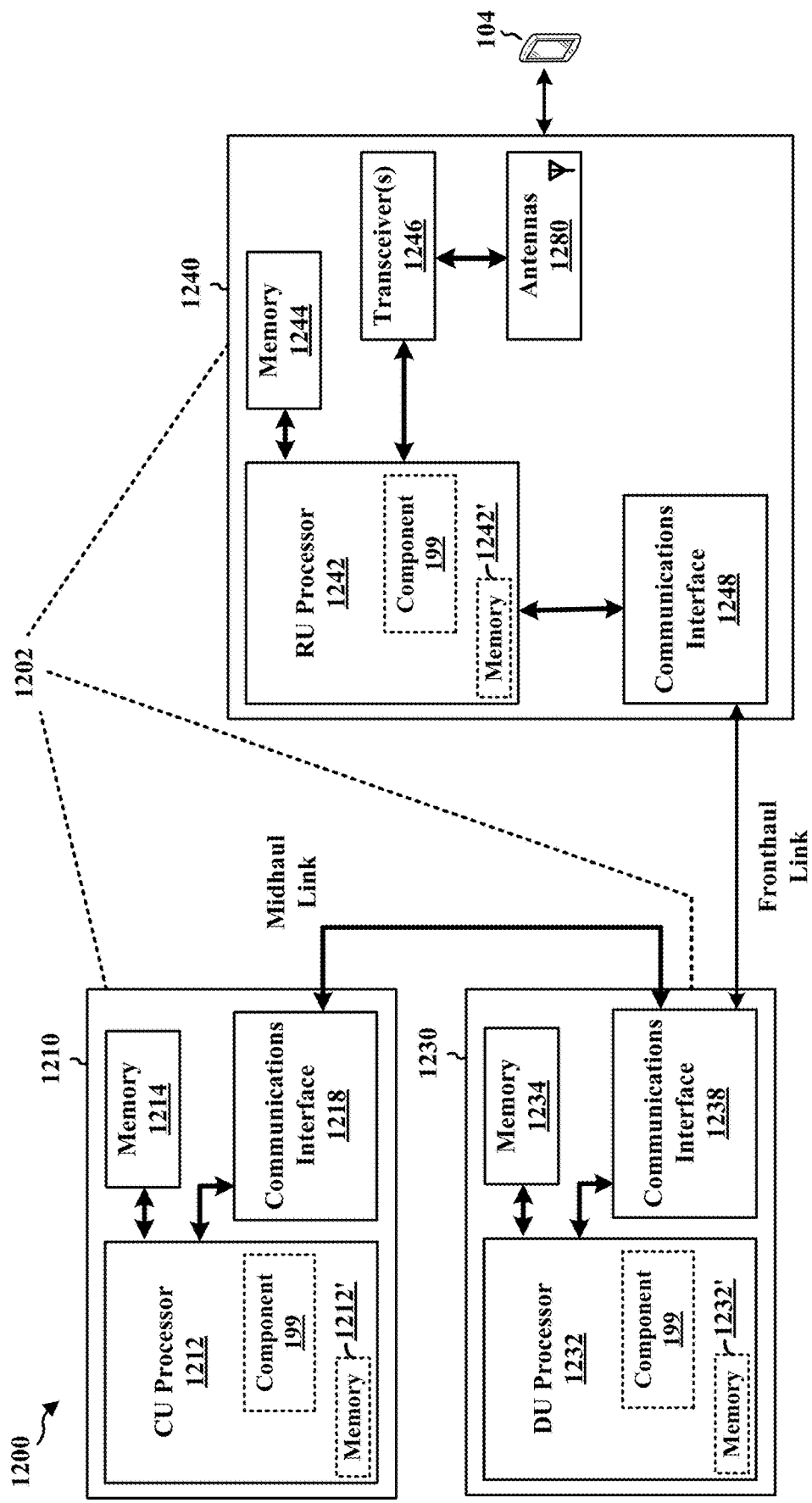
FIG. 12 is a diagram illustrating an example of a hardware implementation for an example network entity.

FIG. 12 is a diagram 1200 illustrating an example of a hardware implementation for a network entity 1202. The network entity 1202 may be a BS, a component of a BS, or may implement BS functionality. The network entity 1202 may include at least one of a CU 1210, a DU 1230, or an RU 1240. For example, depending on the layer functionality handled by the component 199, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include a CU processor 1212. The CU processor 1212 may include on-chip memory 1212'. In some aspects, the CU 1210 may further include additional memory modules 1214 and a communications interface 1218. The CU 1210 communicates with the DU 1230 through a midhaul link, such as an F1 interface. The DU 1230 may include a DU processor 1232. The DU processor 1232 may include on-chip memory 1232'. In some aspects, the DU 1230 may further include additional memory modules 1234 and a communications interface 1238. The DU 1230 communicates with the RU 1240 through a fronthaul link. The RU 1240 may include an RU processor 1242. The RU processor 1242 may include on-chip memory 1242'. In some aspects, the RU 1240 may further include additional memory modules 1244, one or more transceivers 1246, antennas 1280, and a communications interface 1248. The RU 1240 communicates with the UE 104. The on-chip memory 1212', 1232', 1242' and the additional memory modules 1214, 1234, 1244 may each be considered a computer-readable medium/memory. Each computer-readable medium/memory may be non-transitory. Each of the processors 1212, 1232, 1242 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to transmit one or more pilot signals superimposed on a data signal, from the network entity to a UE. The component 199 may be further configured to indicate, to the UE, a first set of locations in at least one of time or frequency. The data signal may be near orthogonal to a channel estimation filter of the transmission channel between the network entity and the UE at the first set of locations. The component 199 may be further configured to receive, from the UE, characteristics of the transmission channel. The characteristics of the transmission channel may include one or more of: the channel estimation of the transmission channel, a measurement of the channel estimation, or other requested characteristics of the transmission channel, such as the channel quality/strength, the best channel among the available channels. The component 199 may be further configured to perform any of the aspects described in connection with the flowchart in FIG. 9, FIG. 10, and/or performed by the base station 604 in FIG. 6. The component 199 may be within one or more processors of one or more of the CU 1210, DU 1230, and the RU 1240. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1202 may include a variety of components configured for various functions. In one configuration, the network entity 1202 includes means for transmitting one or more pilot signals superimposed on a data signal, from the network entity to a UE, and means for indicating, to the UE, a first set of locations in at least one of time or frequency. The data signal may be near orthogonal to a channel estimation filter of the transmission channel between the network entity and the UE at the first set of locations. The network entity 1202 may further include means for receiving, from the UE, characteristics of the transmission channel. The characteristics of the transmission channel may include one or more of: the channel estimation of the transmission channel, a measurement of the channel estimation, or other requested characteristics of the transmission channel, such as the channel quality/strength, the best channel among the available channels. The network entity may further include means for performing any of the aspects described in connection with the flowcharts in FIGS. 9 and 10, and/or the aspects performed by the base station 604 in FIG. 6. The means may be the component 199 of the network entity 1202 configured to perform the functions recited by the means. As described supra, the network entity 1202 may include the TX processor 316, the RX processor 370, and the controller/processor 375. As such, in one configuration, the means may be the TX processor 316, the RX processor 370, and/or the controller/processor 375 configured to perform the functions recited by the means.

This disclosure provides a method for wireless communication at a UE. The method may include receiving, from a network entity, one or more pilot signals superimposed on a data signal. The method may further include receiving, from the network entity, an indication of a first set of locations in at least one of time or frequency. The data signal may be near orthogonal to a channel estimation filter of the transmission channel between the network entity and the UE at the first set of locations. The method may further include transmitting, to the network entity, characteristics of the transmission channel. The characteristics of the transmission channel may include one or more of: the channel estimation of the transmission channel, a measurement of the channel estimation, or other requested characteristics of the transmission channel, such as the channel quality/strength, the best channel among the available channels. By signaling the regions where the data and the pilots are substantially orthogonal, this method enables a more efficient and accurate channel estimation of the transmission channel based on these regions. Thus, it improves the efficiency of wireless communication.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE. The method includes receiving, from a network entity, one or more pilot signals superimposed on a data signal; receiving, from the network entity, an indication of a first set of locations in at least one of time or frequency, where the data signal is near orthogonal to a channel estimation filter of the transmission channel between the network entity and the UE at the first set of locations; and transmitting, to the network entity, characteristics of the transmission channel, where the characteristics of the transmission channel is determined based at least in part on the first set of locations.

Aspect 2 is the method of aspect 1, where, at the first set of locations, the convolution of the data signal and the channel estimation filter may be less than a threshold.

Aspect 3 is the method of any of aspects 1 and 2, where the method may further include transmitting, to the network entity, the channel estimation filter for the channel estimation of the transmission channel.

Aspect 4 is the method of aspect 3, where the channel estimation filter may include a 2D minimum mean-square-error filter.

Aspect 5 is the method of aspect 3, where transmitting the channel estimation filter may include: transmitting PDP and SNR associated with the transmission channel, where the channel estimation filter is based on the PDP and the SNR.

Aspect 6 is the method of aspect 5, where a filter span of the channel estimation filter may be based on the coherence time and the coherence bandwidth.

Aspect 7 is the method of aspect 3, where transmitting the channel estimation filter may include: transmitting a fixed filter covering a predetermined region in time and frequency domains, where the channel estimation filter may be based on the fixed filter.

Aspect 8 is the method of aspect 7, where the fixed filter may include an averaging filter.

Aspect 9 is the method of any of aspects 2 to 8, where the threshold may be transmitted through an RRC message or a MAC-CE message, and where the channel estimation filter may be transmitted through an RRC message or a MAC-CE message.

Aspect 10 is the method of any of aspects 3 to 9, where receiving the indication of the first set of locations in at least one of time or frequency may include: receiving the indication of the first set of locations in at least one of time or frequency periodically at a preset interval.

Aspect 11 is the method of aspect 10, where the preset interval may be one slot, and the indication may be received as a part of DCI.

Aspect 12 is the method of any of aspects 3 to 11, where the method further includes receiving, from the network entity, one or more scrambling sequences; and applying de-scrambling associated with the one or more scrambling sequences on the data signal and the one or more pilot signals received from the network entity.

Aspect 13 is the method of aspect 12, where the one or more scrambling sequences may be selected from columns of the FHT matrix.

Aspect 14 is an apparatus for wireless communication at a UE, including: a memory; and at least one processor coupled to the memory and, based at least in part on information stored in the memory, the at least one processor is configured to perform the method of any of aspects 1-13.

Aspect 15 is the apparatus of aspect 14, further including at least one of a transceiver or an antenna coupled to the at least one processor.

Aspect 16 is an apparatus for wireless communication including means for implementing the method of any of aspects 1-13.

Aspect 17 is a computer-readable medium (e.g., a non-transitory computer-readable medium) storing computer-executable code, where the code, when executed by a processor, causes the processor to implement the method of any of aspects 1-13.

Aspect 18 is a method of wireless communication at a network entity. The method includes transmitting one or more pilot signals superimposed on a data signal, from the network entity to a UE; and indicating, to the UE, a first set of locations in at least one of time or frequency. The data signal may BE near orthogonal to a channel estimation filter of the transmission channel between the network entity and the UE at the first set of locations. The method may further include receiving, from the UE, characteristics of the transmission channel, wherein the characteristics of the transmission channel are determined based at least in part on the first set of locations.

Aspect 19 is the method of aspect 18, where, at the first set of locations, the convolution of the data signal and the channel estimation filter may be less than a threshold.

Aspect 20 is the method of any of aspects 18 and 19, where the method may further include obtaining, by the network entity, the channel estimation filter for the channel estimation of the transmission channel.

Aspect 21 is the method of aspect 20, where the channel estimation filter may include a 2D minimum mean-square-error filter.

Aspect 22 is the method of aspect 20, where obtaining the channel estimation filter may include: receiving, from the UE, the channel estimation filter.

Aspect 23 is the method of aspect 20, where obtaining the channel estimation filter may include: receiving PDP and SNR associated with the transmission channel; and determining, based on the PDP and the SNR, the channel estimation filter.

Aspect 24 is the method of aspect 23, where a filter span of the channel estimation filter may be based on the coherence time and the coherence bandwidth.

Aspect 25 is the method of aspect 20, where obtaining the channel estimation filter may include: receiving a fixed filter covering a predetermined region in time and frequency domains, where the channel estimation filter may be based on the fixed filter.

Aspect 26 is the method of aspect 25, where the fixed filter may include an averaging filter.

Aspect 27 is the method of any of aspects 19 to 26, where the threshold may be received through an RRC message or a MAC-CE message, and the channel estimation filter may be obtained through an RRC message or a MAC-CE message.

Aspect 28 is the method of any of aspects 20 to 27, where indicating the first set of locations in at least one of time or frequency may include: indicating the first set of locations in at least one of time or frequency periodically at a preset interval.

Aspect 29 is the method of aspect 28, where the preset interval may be one slot, and the first set of locations may be indicated as a part of DCI.

Aspect 30 is the method of any of aspects 20 to 29, where the method further includes applying one or more scrambling sequences to the one or more pilot signals superimposed on the data signal; and indicating the one or more scrambling sequences to the UE.

Aspect 31 is the method of aspect 30, where the one or more scrambling sequences may be selected from columns of the FHT matrix.

Aspect 32 is an apparatus for wireless communication at a network entity, including:

a memory; and at least one processor coupled to the memory and, based at least in part on information stored in the memory, the at least one processor is configured to perform the method of any of aspects 18-31.

Aspect 33 is the apparatus of aspect 32, further including at least one of a transceiver or an antenna coupled to the at least one processor.

Aspect 34 is an apparatus for wireless communication including means for implementing the method of any of aspects 18-31.

Aspect 35 is a computer-readable medium (e.g., a non-transitory computer-readable medium) storing computer-executable code, where the code, when executed by a processor, causes the processor to implement the method of any of aspects 18-31.

What is claimed is:

1. An apparatus for wireless communication at a user equipment (UE), comprising:
   a memory; and
   at least one processor coupled to the memory and, based at least in part on information stored in the memory, the at least one processor is configured to:
      receive, from a network entity, one or more pilot signals superimposed on a data signal;
      receive, from the network entity, an indication of a first set of locations in at least one of time or frequency, wherein the data signal is near orthogonal to a channel estimation filter of a transmission channel between the network entity and the UE at the first set of locations; and
      transmit, to the network entity, characteristics of the transmission channel, wherein the characteristics of the transmission channel is determined based at least in part on the first set of locations.

2. The apparatus of claim 1, wherein, at the first set of locations, a convolution of the data signal and the channel estimation filter is less than a threshold.

3. The apparatus of claim 1, wherein the at least one processor is further configured to:
   transmit, to the network entity, the channel estimation filter.

4. The apparatus of claim 3, wherein the channel estimation filter comprises a 2-dimensional (2D) minimum mean-square-error filter.

5. The apparatus of claim 3, wherein to transmit the channel estimation filter, the at least one processor is configured to:
   transmit power delay profile (PDP) and signal noise ratio (SNR) associated with the transmission channel, wherein the channel estimation filter is based on the PDP and the SNR.

6. The apparatus of claim 5, wherein a filter span of the channel estimation filter is based on a coherence time and a coherence bandwidth.

7. The apparatus of claim 3, wherein, to transmit the channel estimation filter, the at least one processor is configured to:
   transmit an index identifying a fixed filter covering a predetermined region in time and frequency domains in a filter table comprising a plurality of filters, wherein the channel estimation filter is based on the fixed filter.

8. The apparatus of claim 7, wherein the fixed filter comprises an averaging filter.

9. The apparatus of claim 2, wherein the threshold is transmitted through a Radio Resource Control (RRC) message or a medium access control (MAC) control element (MAC-CE) message, and wherein the channel estimation filter is transmitted through an RRC message or a MAC-CE message.

10. The apparatus of claim 3, wherein the at least one processor is configured to receive the indication of the first set of locations in the at least one of time or frequency periodically at a preset interval.

11. The apparatus of claim 10, wherein the preset interval is one slot, and the indication is received as a part of downlink control information (DCI).

12. The apparatus of claim 3, wherein the at least one processor is further configured to:
receive, from the network entity, one or more scrambling sequences, wherein the one or more pilot signals superimposed on the data signal are scrambled based on the one or more scrambling sequences; and
apply de-scrambling associated with the one or more scrambling sequences on the data signal and the one or more pilot signals received from the network entity.

13. The apparatus of claim 12, wherein the one or more scrambling sequences are selected from columns of a fast Hartley transform (FHT) matrix.

14. The apparatus of claim 1, further comprising at least one of a transceiver or an antenna coupled to the at least one processor, wherein at least one of the transceiver or the antenna is configured to receive the indication of the first set of locations via a MAC-CE or DCI.

15. An apparatus for wireless communication at a network entity, comprising:
a memory; and
at least one processor coupled to the memory and, based at least in part on information stored in the memory, the at least one processor is configured to:
transmit one or more pilot signals superimposed on a data signal, from the network entity to a user equipment (UE);
indicate, to the UE, a first set of locations in at least one of time or frequency, wherein the data signal is near orthogonal to a channel estimation filter of a transmission channel between the network entity and the UE at the first set of locations; and
receive, from the UE, characteristics of the transmission channel, wherein the characteristics of the transmission channel are determined based at least in part on the first set of locations.

16. The apparatus of claim 15, wherein, at the first set of locations, a convolution of the data signal and the channel estimation filter is less than a threshold.

17. The apparatus of claim 15, wherein the at least one processor is further configured to:
obtain, from the UE, the channel estimation filter.

18. The apparatus of claim 17, wherein the channel estimation filter comprises a 2-dimensional (2D) minimum mean-square-error filter.

19. The apparatus of claim 17, wherein, to obtain the channel estimation filter, the at least one processor is configured to:
receive, from the UE, the channel estimation filter.

20. The apparatus of claim 17, wherein, to obtain the channel estimation filter, the at least one processor is configured to:
receive power delay profile (PDP) and signal noise ratio (SNR) associated with the transmission channel; and
determine, based on the PDP and the SNR, the channel estimation filter.

21. The apparatus of claim 20, wherein a filter span of the channel estimation filter is based on a coherence time and a coherence bandwidth.

22. The apparatus of claim 17, wherein, to obtain the channel estimation filter, the at least one processor is configured to:
receive an index identifying a fixed filter covering a predetermined region in time and frequency domains in a filter table comprising a plurality of filters, wherein the channel estimation filter is based on the fixed filter.

23. The apparatus of claim 22, wherein the fixed filter comprises an averaging filter.

24. The apparatus of claim 16, wherein the threshold is received through a Radio Resource Control (RRC) message or a medium access control (MAC) control element (MAC-CE) message, and wherein the channel estimation filter is obtained through an RRC message or a MAC-CE message.

25. The apparatus of claim 17, wherein the at least one processor is configured to indicate the first set of locations in the at least one of time or frequency periodically at a preset interval.

26. The apparatus of claim 25, wherein the preset interval is one slot, and the first set of locations are indicated as a part of downlink control information (DCI).

27. The apparatus of claim 17, wherein the at least one processor is further configured to:
apply one or more scrambling sequences to the one or more pilot signals superimposed on the data signal; and
indicate the one or more scrambling sequences to the UE.

28. The apparatus of claim 27, wherein the one or more scrambling sequences are selected from columns of a fast Hartley transform (FHT) matrix.

29. A method of wireless communication at a user equipment (UE), comprising:
receiving, from a network entity, one or more pilot signals superimposed on a data signal;
receiving, from the network entity, an indication of a first set of locations in at least one of time or frequency, wherein the data signal is near orthogonal to a channel estimation filter of a transmission channel between the network entity and the UE at the first set of locations; and
transmitting, to the network entity, characteristics of the transmission channel, wherein the characteristics of the transmission channel are determined based at least in part on the first set of locations.

30. A method of wireless communication at a network entity, comprising:
transmitting one or more pilot signals superimposed on a data signal, from the network entity to a user equipment (UE);
indicating, to the UE, a first set of locations in at least one of time or frequency, wherein the data signal is near orthogonal to a channel estimation filter of a transmission channel between the network entity and the UE at the first set of locations; and
receiving, from the UE, characteristics of the transmission channel, wherein the characteristics of the transmission channel are determined based at least in part on the first set of locations.

* * * * *